Figure 1:
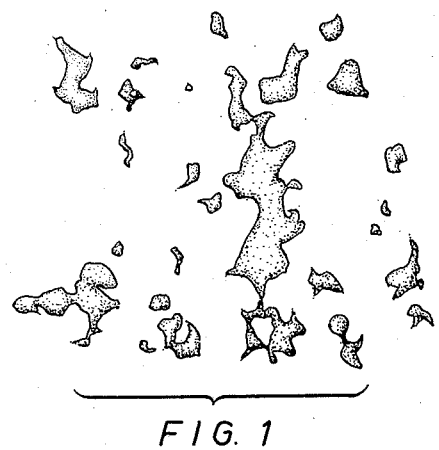

Nov. 10, 1964   B. MEDDINGS ETAL   3,156,556
METHOD OF PRODUCING FINE SPHERICAL METAL POWDERS
Filed July 20, 1962

Inventors
Basil Meddings
David J. I. Evans
by:
Attorney

United States Patent Office 3,156,556
Patented Nov. 10, 1964

3,156,556
METHOD OF PRODUCING FINE SPHERICAL
METAL POWDERS
Basil Meddings, Fort Saskatchewan, Alberta, and David John Ivor Evans, Edmonton, Alberta, Canada, assignors to Sherritt Gordon Mines Limited, Toronto, Ontario, Canada, a company of Canada
Filed July 20, 1962, Ser. No. 211,347
7 Claims. (Cl. 75—.5)

This invention relates to a method of preparing fine spherical metal powder. It is particularly directed to providing a method for the production of nickel metal particles which are smaller than about 44 microns in diameter, which are of a relatively uniform size, and which are spherical or nearly spherical in shape.

Methods are known for the preparation of finely divided metal particles. The known methods include the reduction of metal oxides in the solid state by reaction with a reducing gas such as hydrogen, electrolytic deposition procdures, atomizing and mechanical pulverizing. None of these methods can be readily adapted for the preparation of spherical shaped particles except, possibily, the atomizing of liquid metal. In this latter method, a fine spray of molten metal forms spherical particles which retain their shape on solidification. However, a very wide range of particle sizes is obtained and the specifically desired sized particle fraction usually is so small as to make this method of preparation very costly, particularly in respect of the high melting temperature metals.

Processes are also known in which a metal, having an oxidation-reduction potential between that of silver and cadmium inclusive, in the electrochemical series of the elements, and which is capable of forming with ammonia in aqueous solution a complex cation, the salt of which is more soluble than is the metal in elemental form, can be precipitated in the form of finely divided elemental metal particles of random shape and of a size within the range of from sub-micron to about 300 microns from a solution in which it is present as a dissolved salt by reacting the solution with a sulphur-free reducing gas at elevated temperature and pressure.

It is known, also, that the presence, in the solution, of a minor amount of a nucleation promoter, aids in the initiation of and serves to promote the reducing reaction and the precipitation of the desired metal in the form of finely divided metal particles, particularly in respect to the less electropositive metals such as nickel and cobalt.

It is known, also, that metal present in the solution as a dissolved salt can be precipitated therefrom as a film or coating of metal in elemental form on the surfaces of seed particles of the same or other metals or non-metals held in suspension in the solution subjected to the reducing reaction.

Metal particles of random size and shape are ideally adapted for compacting purposes. However, there are existing and potential uses for small, spherical shaped metal powders, such as in the manufacture of material which has a controlled and predictable permeability to the flow of fluids.

We have found that the above described process in which metal particles are precipitated from a solution in which the metal is present as a dissolved salt by reacting the solution with a sulphur-free reducing gas at elevated temperature and pressure can be employed to produce metal or metal coated particles of spherical or of substantially spherical shape with the major portion of the yield being within a predetermined desired size range within the range of from 1 micron size to about 44 micron size, usually within the range of from 5 microns to about 35 microns, without appreciable increase in the cost of producing metal particles of random size and shape by this known process.

The now known gaseous reduction process in which product metal particles are produced involves reacting a solution, in which the metal of interest is present as a dissolved salt, with a reducing gas, such as hydrogen or carbon monoxide or a mixture thereof, at elevated temperature and pressure. The dissolved salt can be derived from an inorganic or organic acid and the solution can be acid, neutral or alkaline.

In the precipitation of nickel by this now known gaseous reduction process, it usually is preferred to provide in the solution either finely divided seed nickel particles or a nucleation promoter to initiate the reducing reaction and provide seed or nuclei on which the nickel deposits and grows as the reaction proceeds. The amount of nickel salt dissolved in the solution is not critical although it is preferred to employ a concentration such that the process can be conducted as a commercially practical operation but safely below that at which there would be precipitation of the salt from the solution by crystallization. Concentrations of from about 30 to about 60 grams of nickel per litre are satisfactory.

The reducing reaction usually is conducted at a temperature above 100° C. and preferably within the range of from about 150° C. to about 300° C. The total pressure at which the reaction is conducted is determined by the pressure autogeneously developed by the temperature plus the partial pressure of the reducing gas. The reaction can be conducted under a partial pressure of reducing gas of as low as about 50 pounds per square inch but it proceeds slowly. Higher pressures are preferred. A preferred partial pressure of reducing gas is within the range of from about 100 to about 500 pounds per square inch. Higher temperatures and pressures can be employed, of course, but the increased reaction rate obtained does not warrant the increased capital and operation costs inherent in the use of high pressure equipment.

Optimum results are obtained when the reducing reaction is applied to a solution having a pH value within the range of from about 7 to 9. The reaction is acid forming. That is, for each mole of metal precipitated, one mole of dibasic acid is formed. Thus, it is necessary to provide in the solution, either initially or during the course of the reaction, sufficient neutralizing agent to maintain the pH value above the predetermined minimum, preferably approximate to that value at which optimum results are obtained, having regard to the solution subjected to treatment. Sodium hydroxide, NaOH, or ammonia, $NH_3$, are suitable neutralizing agents, of which ammonia may be preferred as it forms an ammonium salt which may have a market value when recovered from the end solution. Theoretically, two moles of neutralizing agent are required per mole of divalent nickel precipitated to combine with the released acid radicals to form a salt such as, for example, sodium or ammonium carbonate or sulphate. Preferably, a slight excess of neutralizing agent is provided in the solution, for example, from about 2.1 to 2.5 moles per mole of nickel prior to initiating the reducing reaction. The neutralizing agent can be added to the solution during the reaction if desired. The term "neutralizing agent acid salt" is used throughout the description of this invention and in the claims to describe, in general terms, the salt formed by the combination of the released acid radicals and the neutralizing agent.

A metal or non-metal seed may be provided in the solution to assist in the control of particle size and increase the rate at which the reducing reaction proceeds. In practice, the seed may be provided as a small addition of solid particles or a nucleation promoter or agent may be added to the solution to form seed or nuclei simultaneously with the reducing reaction.

The following Example 1 is illustrative of the operation of the known process described above.

EXAMPLE 1

9.6 litres of an aqueous nickel ammine sulphate solution containing 50 grams per litre nickel, 1.9 moles of ammonia per mole of nickel, and 300 grams per litre of ammonia sulphate were charged into a high pressure autoclave. 1.0 gram per litre of ferrous sulphate was added to the charge as a nucleation promoter to initiate the reducing reaction. The solution was heated to reaction temperature, 350° F., in the absence of hydrogen; hydrogen was then introduced to the solution at the reaction temperature, and the reducing reaction was complete in 5 minutes. The precipitated nickel particles were very fine, in the range of from sub-micron to about 3 microns in size, and were of random, polyangular shape. This type of particle is illustrated in the photomicrograph identified as FIGURE 1 in the accompanying drawing.

It is known, also, that the addition of a small amount of a member selected from the group consisting of anthraquinone and substituted anthraquinones improves the surface characteristics of the nickel particles and accelerates the reduction reaction. This group of activation agents or catalysts includes, but is not necessarily limited to, anthraquinone, alizarin, 1- and 2-amino anthraquinone, and other substituted anthraquinones. Satisfactory results have also been obtained from the use of benzoquinone, naphthoquinone, ortho- and para-polyhydric phenols, such as pyrogallol and tannic acid, and morin. The activation agent of this group can be used alone but the best results are obtained when it is used with an added metal or non-metal seed or nucleation promoter or agent, such as ferrous sulphate. It is preferred to use this activation agent or catalyst in amount within the range equivalent to from about 0.01 to about 0.20 gram of anthraquinone per litre of solution. Greater amounts can be employed if desired, for example, up to about 1 gram per litre or more. However, increased amounts above about 1 gram per litre, do not improve the rate of the reduction or the physical characteristics of the particles and the carbon content of the added compound may contaminate the purity of the desired metal product.

The following Example 2 illustrates the operation of the known process described above using nickel seed in place of ferrous sulphate catalyst and with the addition of 0.2 gram per litre anthraquinone.

EXAMPLE 2

In this example, nickel ammonium sulphate was dissolved in water to produce a solution which contained 47 grams per litre nickel and 106 grams per litre of ammonium sulphate. Ammonia was added to this solution to produce a ratio of 2.2 moles of ammonia per mole of nickel. The activation agent, 0.2 gram of anthraquinone per litre, was added to the solution along with 0.2 gram per litre of nickel seed particles of from about 1 to 2 microns in size. The solution was heated to 350° F. in the absence of hydrogen; hydrogen was then admitted to the reaction vessel at a partial pressure of 350 pounds per square inch. The reducing reaction was complete in 3 minutes; the precipitated nickel particles were slightly larger, averaging about 9 microns, and more agglomerated than those produced in Example 1; they were irregular in shape and essentially indistinguishable from the particles shown in FIGURE 1, except as to size.

We have found, by the improved method of this invention, that fine spherical nickel particles can be produced by a simple modification of the process described above and illustrated in Examples 1 and 2. The nickel bearing solution used in the known process conventionally contains a finite amount of neutralizing agent acid salt, generally from about 100 g.p.l. to about 500 g.p.l. We have found that if the reduction solution initially contains no neutralizing agent acid salt, the nickel particles precipitated in the reducing reaction are in the form of spheres of which a major portion is of substantially uniform, predetermined size, within the range from 1 micron to about 44 microns.

We have found also that when the reducing reaction is initiated in the absence of a neutralizing agent acid salt, for example ammonium sulphate in the case of nickel sulphate solutions, the solution subjected to treatment is very viscous, at least during the early stages of the reaction. It is believed that the unique spherical shape of the nickel particles precipitated under these conditions can be attributed primarily to the high viscosity of the solution at the outset of the reducing reaction. The invention is, of course, based on observations and results obtained in its operation and is free from hypothetical considerations. A reasonable explanation of the phenomenon is that the highly viscous nature of the solution prevents inter-particle collision of the precipitated nickel particles during the course of the reduction, thus permitting a uniform deposition of nickel on the individual particles. The very viscous nature of the solution would also only allow the growing metal particles to be supplied by nickel ions from a limited local region of surrounding solution. The high viscosity therefore offers a plausible explanation of the relative lack of agglomeration observed and the uniform size and shape of the precipitated particles. The overall result is that fine spherical particles are produced of which the major portion are within a size range of from about 5 microns to about 35 microns.

The following Example 3 illustrates the manner in which the improved method of this invention is conducted to produce nickel particles in the form of spheres.

EXAMPLE 3

A nickel sulphate solution was prepared by leaching nickel powder with an aqueous sulphuric acid solution. The leach solution, which contained 43.5 grams per litre nickel and no free sulphuric acid, was ammoniated to produce an ammonia to nickel mole ratio of 2.0:1. This solution had a pH of 7 and contained no ammonium sulphate. 9.6 litres of solution were charged into an autoclave. 0.2 gram per litre of nickel seed, produced by the conventional process described in Example 1, was added to initiate the reduction reaction, and 0.10 gram per litre alizarin, a substituted anthraquinone, was added to further activate the nickel seed particles. The solution was heated to 350° F. in the absence of hydrogen. Hydrogen was then admitted to the autoclave to produce a partial pressure of hydrogen of 350 pounds per square inch. At the end of the reaction period, the pH value of the solution was 6.6 and it contained 1 g.p.l. nickel. The precipitated nickel was in the form of fine spherical particles of from 5 to 10 microns in size. Many of the individual particles adhered together to form agglomerates or clusters of spherical particles.

We have found further that by providing in the solution a small but effective amount of higher fatty acid or a salt thereof, agglomeration of particles, or the adhesion of pluralities of particles in the form of agglomerates, is substantially reduced during the reducing reaction. The term "fatty acids" as used herein includes stearic acid, oleic acid and palmitic acid. The higher fatty acid or the salt thereof is preferably provided in a form in which it is readily dispersed in the solution.

The amount of higher fatty acid or salt thereof provided in the solution is not critical provided that the equivalent of more than about 0.01 gram per litre of stearic acid is provided. An amount in excess of about 1 gram per litre does not produce increasingly improved results. Thus, the fatty acid, or the salt thereof, is provided in the solution in amount equivalent to from about 0.01 to about 1 gram per litre stearic acid with a preferred addition of from about 0.01 to about 0.20 gram per litre.

The higher fatty acid, or salt thereof, can be added to the solution as a solid, such as in the form of finely divided solid particles. We have found, however, that the best results are obtained when it is dissolved in a solvent, such as alcohol, and added in the form of a solution. Very satisfactory results have been obtained in the use of a 10% solution of stearic acid in alcohol. Salts of higher fatty acids also are readily available and are relatively inexpensive, such as ammonium, sodium and potassium salts of oleic, palmitic and stearic acids.

As stated above, the reducing reaction is acid forming and a neutralizing agent is added before initiating the reaction or during the reaction, thus to maintain the solution at a predetermined pH value, at which it proceeds rapidly to completion. Aqueous ammonia or ammonia or sodium hydroxides are suggested as suitable neutralizing agents.

The following Example 4 illustrates the improved results that are obtained with the use of a higher fatty acid in the solution subjected to treatment.

EXAMPLE 4

Figure 2:
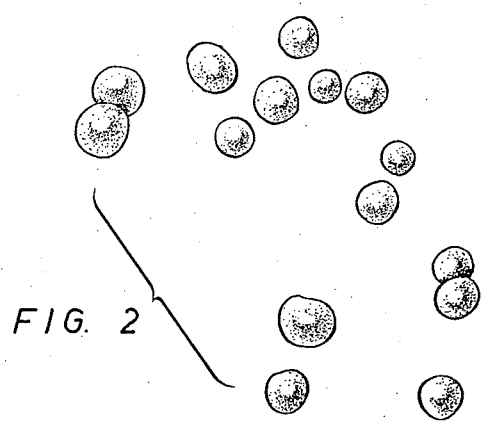

60 litres of an aqueous nickel sulphate solution contained 43.5 g.p.l. nickel and 1.98 moles of ammonia per mole of nickel and no ammonium sulphate. 0.10 g.p.l. alizarin, 0.2 g.p.l. nickel seed (average size 2 microns), and 0.15 g.p.l. stearic acid as a 10% alcohol solution were added to this solution. The solution was charged into a 25 gallon autoclave equipped with an agitator, heated to 350° F. in the absence of hydrogen, and then reacted with hydrogen at a partial pressure of 350 p.s.i. The reaction was complete in 2 minutes. The precipitated nickel powder was in the form of fine spherical particles of a size within the range of from about 5 to 10 microns. The type of particle produced in this Example 4 is illustrated by the photomicrograph identified as FIGURE 2 of the drawing.

Example 4 illustrates a preferred embodiment of the invention. In another embodiment, ferrous sulphate nucleation promoter was used to initiate the reaction instead of fine nickel seed. The particles produced in this case are also spherical, but they are of a smaller average size, in the range of 1 to 4 microns, than are those produced with nickel seed. This smaller average size is attributable to the very small size and greater number of the nuclei provided by the ferrous sulphate addition as compared with that produced by the nickel seed addition.

Additional results which show the effect of the different variables in the operation of the process are set out in Table 1. For comparative purposes, the results from Examples 1, 2, 3, and 4 are also included in the table. In each test, nickel was present as a dissolved salt in an ammine sulphate solution. The solution was reacted at 350° F. with hydrogen at a partial pressure of 350 p.s.i.

*Table 1*

| No. | Ni, g.p.l. | $NH_3$:Ni, molar ratio | $(NH_4)_2SO_4$, g.p.l., Start | Activation agent or catalyst, g.p.l. | Nuclei on nucleation promoter, g.p.l. | Fatty acid, g.p.l. | Reaction time, mins. | Apparent density, g. cm.$^{-3}$ | Fisher subsieve, microns | Microscope examination |
|---|---|---|---|---|---|---|---|---|---|---|
| 1 | 50 | 1.9 | 300 | Nil | $FeSO_4$, 1.0 gm | Nil | 5 | 0.8 | 0.8 | Irregular-angular. |
| 2 | 47 | 2.2 | 106 | Anthra. 0.2. | 2μ Ni seed, 0.2 | Nil | 3 | n.a. | Aver. 9.0 | Do. |
| 3 | 43.5 | 2.0 | Nil | Alizarin 0.01. | 2μ Ni seed, 0.2 | Nil | 10 | 2.03 | 12.8 | Spherical powder agglomerated. |
| 4 | 43.5 | 1.98 | Nil | ----do---- | 2μ Ni seed, 0.2 | Stearic¹ acid, 0.15 | 2 | 4.12 | Aver. 11.9 | Good spherical powder. |
| 5 | 47 | 2.2 | 300 | Anthra. 0.2. | 2μ Ni seed, .2 gm | None | 12 | 1.7 | 2–9 | Random shape, irregular. |
| 6 | 43.5 | 2.0 | Nil | Nil | 2μ Ni seed, 0.2 | Stearic¹ acid, 0.15 | 80 | n.a. | 11.3 | Random shapes, very agglomerated. |
| 7 | 45.0 | | 110 | Anthra. 0.2. | $FeSO_4$, 1.0 gm | Stearic¹ acid, 0.10 | 5 | 0.99 | 1.4 | Irregular-angular. |
| 8 | 45.0 | 2 | Nil | ----do---- | $FeSO_4$, 1.0 gm | Stearic¹ acid, 0.10 | 15 | 1.69 | 1.7–3.5 | Fine spherical powder, some agglomeration. |
| 9 | 43.5 | 2.0 | Nil | Alizarin | 2μ Ni seed, 0.2 | Stearic acid added as solid, 0.15. | 12 | 1.21 | 2.82 | Spherical powder, very agglomerated. |
| 10 | 43.5 | 4.5 | Nil | Alizarin 0.10. | 2μ Ni seed, 0.2 | Stearic acid,¹ 0.15 | 5 | 1.68 | 12.6 | Random shapes, extensive agglomeration. |

¹ Stearic acid added as 10% solution in alcohol.

The results obtained in the tests set out clearly illustrate that:

(a) There should be no neutralizing agent acid salt present in the solution at the time of initiating the reaction;

(b) An activation agent or catalyst selected from the group consisting of anthraquinone and substituted anthraquinones is required in the solution to produce metal particles in the form of spheres;

(c) The addition of a fatty acid to the solution greatly reduces the tendency of the precipitated nickel particles to form agglomerates;

(d) The use of a nucleation agent such as ferrous sulphate to initiate the reaction results in a much finer sized product and increased agglomeration than is obtained by using fine nickel seed particles;

(e) The neutralizing agent should be provided in the solution within the range of from about 1.8 to about 2.5 moles per mole of nickel;

(f) Improved results are obtained when the fatty acid is added as a solution so that it becomes uniformly dispersed throughout the system, e.g., when added in alcohol solution.

What we claim as new and desire to protect by Letters Patent of the United States is:

1. A method for the production of nickel powder formed of spherical particles by reacting an aqueous ammoniacal nickel sulphate solution with hydrogen gas at elevated temperature and pressure comprising initiating said reaction in a solution which is adjusted to contain, in solution, 1 mole of sulphate radical per mole of nickel and ammonia in an amount equivalent to about 1.8 to about 2.5 moles of ammonia per mole of dissolved nickel; and in which is provided an addition agent capable of initiating and promoting the reducing reaction in an amount within the range of from about 0.1 to about 1 gram per litre, and a catalyst selected from the group consisting of anthraquinone, substituted anthraquinones, benzoquinone, naphthaquinone, tannic acid and morin in amount of at least about 0.01 gram per litre.

2. The method according to claim 1 in which the addition agent is finely divided nickel particles of a size within the range of from about 1 to about 3 microns.

3. The method according to claim 1 in which the addition agent is ferrous sulphate.

4. A method for the production of nickel powder formed substantially wholly of spherical particles of a size within the range of from about 5 to about 35 microns by reacting an aqueous ammoniacal nickel sulphate solution with hydrogen gas at elevated temperature and pressure comprising initiating said reaction in a solution which is adjusted to contain 1 mole of nickel for each mole of sulphate radical, from about 1.8 to about 2.5 moles of ammonia per mole of dissolved nickel, and in which is provided nickel seed particles in amount within the range of from about 0.1 to about 1 gram per litre, and a catalyst selected from the group consisting of anthraquinone, substituted anthraquinones, benzoquinone, naphthaquinone, tannic acid and morin in amount within the range of from about 0.01 to about 1 gram per litre and a member selected from the group consisting of fatty acids and salts thereof in amount equivalent to at least about 0.01 gram to about 1 gram per litre stearic acid.

5. The method of claim 4 in which the catalyst is alizarin.

6. The method according to claim 4 in which the member selected from the group consisting of fatty acids and salts thereof is dissolved in a solvent therefor and is added as a solution to the solution subjected to the reducing reaction.

7. The method according to claim 4 in which the solution is heated to reaction temperature prior to the admission of the hydrogen gas.

References Cited in the file of this patent
UNITED STATES PATENTS

| | | |
|---|---|---|
| 2,796,343 | Shaw et al. | June 18, 1957 |
| 3,062,680 | Middings | Nov. 6, 1962 |